(12) United States Patent
Chang

(10) Patent No.: US 6,928,650 B2
(45) Date of Patent: Aug. 9, 2005

(54) OPTICAL DISK DRIVE

(75) Inventor: Chih-Wei Chang, Taipei Hsien (TW)

(73) Assignee: Micro-Star Int'l Co., Ltd., Jung-He (TW)

( * ) Notice: Subject to any disclaimer, the term of this patent is extended or adjusted under 35 U.S.C. 154(b) by 35 days.

(21) Appl. No.: 10/605,098

(22) Filed: Sep. 9, 2003

(65) Prior Publication Data
US 2004/0205794 A1 Oct. 14, 2004

(30) Foreign Application Priority Data
Jan. 29, 2003 (TW) ........................................ 92201761 U

(51) Int. Cl.⁷ ............................................. G11B 17/30
(52) U.S. Cl. ....................................................... 720/674
(58) Field of Search ................................ 720/674, 675, 720/697, 700

(56) References Cited
U.S. PATENT DOCUMENTS

| | | | | |
|---|---|---|---|---|
| 5,982,735 A | * | 11/1999 | Tsai ........................... | 720/675 |
| 6,005,836 A | * | 12/1999 | Choi .......................... | 720/697 |
| 6,181,669 B1 | * | 1/2001 | Park .......................... | 720/697 |
| 6,385,160 B1 | * | 5/2002 | Jeon .......................... | 720/675 |
| 6,633,532 B1 | * | 10/2003 | Handa ........................ | 720/675 |
| 6,813,773 B2 | * | 11/2004 | Liao et al. .................. | 720/675 |
| 2002/0172137 A1 | * | 11/2002 | Min ........................... | 369/249 |

* cited by examiner

Primary Examiner—A. J. Heinz
Assistant Examiner—Mark Blouin
(74) Attorney, Agent, or Firm—Winston Hsu

(57) ABSTRACT

An optical disk drive includes a mounting plate, a guide bar, a fixing structure for positioning the guide bar on the mounting plate, and a pickup head guided by the guide bar and moveable along a lengthwise direction of the guide bar. The fixing structure includes a fixed joint and a flexible pressure-providing joint. The fixed joint rigidly fixes one end of the guide bar to the mounting plate, the flexible pressure-providing joint positions another end of the guide bar on the mounting plate, and the two ends of the guide bar are fixed in their relative positions due to a flatness of the mounting plate and despite a positioning action of the fixing structure such that linear movement of the pickup head is guided by the guide bar.

2 Claims, 10 Drawing Sheets

OPTICAL DISK DRIVE

BACKGROUND OF INVENTION

1. Field of the Invention

The present invention relates to an optical disk drive, and more specifically, to an optical disk drive having a fixing structure with a fixed guide bar position to avoid deformation of the guide bar when being positioned in the optical disk drive.

2. Description of the Prior Art

Please refer to FIG. 1. FIG. 1 is a three-dimensional exploded view of a prior art optical disk drive. As shown in FIG. 1, the prior art optical disk drive comprises a main body 91, and a top shield 92 and a bottom shield 93 to enclose the main body 91. A tray 94 is installed inside the main body 91 for accommodating an optical disk (not shown), and the tray 94 extends and retracts from the front of the main body 91 (in the figure, the tray is retracted). A mounting plate 95 is installed in the main body 91. The mounting plate 95 comprises a spindle motor 96 for driving the rotation of the optical disk, and a pickup head 97 for reading/writing data on the optical disk. The pickup head 97 is guided by a guide bar 98 positioned on the mounting plate 95 to allow the pickup head 97 to move back and forth along a radial direction of the optical disk. In addition, the pickup head 97 reads/writes data on the optical disk with a laser beam emitted by the pickup head 97 by an optical means. Since the structure and the principle of this portion is similar to that of current optical disk drives, it is not mentioned further.

In consideration of the performance of an optical disk drive, to read/write data correctly is most important. Hence, whether or not the laser beam emitted by the pickup head 97 strikes on the surface of the optical disk at a correct angle is one of the key factors in reading/writing data correctly. As a result, all optical disk drive manufacturers calibrate the relative positions of the pickup head 97 and the rotation plane of the optical disk before optical disk drive products leave the factory to allow the laser beam generated by the pickup head 97 to reflect from the disk at the correct angle.

As to the calibration method, a very frequently utilized method is to keep the moving track of the pickup head 97 in a line, and to adjust the position of the rotation plane of the optical disk. When utilizing this method to calibrate the optical disk drive, the guide bar 98 is usually completely fixed on the mounting plate 95 so the moving track of the pickup head 97 mounted on and guided by the guide bar 98 will be kept along a lengthwise direction of the guide bar 98. An adjusting mechanism (not shown) is installed between the spindle motor 96 and the mounting plate 95 to fine tune the inclination angle between the spindle motor 96 and the plane in which the mounting plate 95 is located. Because the rotation of the optical disk is driven by the spindle motor 96, a slight change of the inclination angle of the spindle motor 96 will calibrate the relative positions of the rotation plane of the optical disk and the pickup head 97.

Please refer to FIG. 2. FIG. 2 is a partial exploded view of the optical disk drive depicted in FIG. 1 illustrating the assembly of a mounting plate and a guide bar. In order to illustrate more conveniently, the mounting plate 95 and the relevant parts in FIG. 1 are shown from a side opposite of that in FIG. 2. As shown in FIG. 2, a first end 981 and a second end 982 of the guide bar 98 of the prior art optical disk drive are fixed to the mounting plate 95 with a first fixed joint 991 and a second fixed joint 992, respectively. The first fixed joint 991 has a supporting part 9911 protruding from a surface of the mounting plate 95, and a fastening screw 9912 screwed to the mounting plate 95. The second fixed joint 992 has a base 961 for fixing the spindle motor 96, an indented engaging means 9921 on a surface of the base 961, and a stop block 9922 screwed to the base 961.

Please refer to FIG. 2, FIG. 3 and FIG. 4. FIG. 3 is a three-dimensional enlarged schematic diagram of portions of the optical disk drive depicted in FIG. 2 after being assembled illustrating the assembly of a first end of the guide bar and the mounting plate. FIG. 4 is a cross-sectional diagram along a line IV—IV in FIG. 3. As shown in FIG. 2 to FIG. 4, the first end 981 of the guide bar 98 is close to the surface of the mounting plate 95 and is positioned between the supporting part 9911 and the fastening screw 9912. The fastening screw 9912 has a head having a large diameter and a tapered inclined plane 9913 underneath the edge of the head. The further the fastening screw 9912 is screwed into the mounting plate 95, the larger the area of the tapering inclined plane 9913 contacting the surface of the first end 981 of the guide bar 98 to exert a pressing force to the first end 981. This pressing force will push the first end 981 to closely contact the mounting plate 95 and the supporting part 9911 so that the first end 981 is closely positioned between the supporting part 9911, the fastening screw 9912, and the mounting plate 95. An unmovable rigid fixing structure is thus formed.

Please refer to FIG. 5. FIG. 5 is a three-dimensional enlarged schematic diagram of portions of the optical disk drive depicted in FIG. 2 after being assembled illustrating the assembly of a second end of the guide bar and the mounting plate. As shown in FIG. 2 and FIG. 5, the second end 982 of the guide bar 98 is engaged with the engaging means 9921. Due to the existence of the stop block 9922 across the top of the engaging means 9921, the second end 982 in the engaging means 9921 is pressed so that the movements of the second end 982 towards both left and right are limited by the engaging means 9921, and the down movement of the second end 982 is hindered by the mounting plate 95. In addition, the upward movement of the second end 982 is suppressed by the stop block 9922. Therefore, an unmovable rigid fixing structure is formed.

However, the first end 981 and the second end 982 of the guide bar 98 are closely positioned on the mounting plate 95, rigidly and without freedom. Although the tightness of the positioning of the guide bar 98 is ensured, the accuracy of a flatness of the mounting plate 95 is not ensured when considering the practices used in manufacturing and assembly. When the previously mentioned rigidly fixing method is utilized to fix the guide bar 98 on the mounting plate 95, once the contact sites of the mounting plate 95 to the first end 981 and the second end 982 of the guide bar 98 are not in the same plane, the relative positions of the first end 981 and the second end 982 of the guide bar 98 will change with the non-planar mounting plate 95 because the first end 981 and the second end 982 are rigidly positioned on the mounting plate 95. Consequently, the guide bar 98 bends and deforms frequently. Furthermore, an automatic tool, such as an electrical screwdriver, is usually utilized when screwing the fastening screw 9912 or the stop block 9922 to the mounting plate 95. A torque generated by the automatic tool is considerable and can amplify the pressing force exerted on the first end 981 and the second end 982 of the guide bar 98, leading to a more severe bending and deformation of the guide bar. As a result, the moving track of the pickup head 97 guided by the guide bar 98 will not be in a line. Since the guide bar 98 loses its axial linearity, even though when there is a finely tuned design for the inclination angle between the spindle motor 96 and the mounting plate 95, it is impossible to ensure that the laser beam emitted by the pickup head 97 strikes on the surface of the optical disk at a correct angle at any site. The correctness and stability of reading/writing data on the optical disk by the pickup head 97 is seriously affected.

In another respect, once the guide bar 98 bends or deforms, the pickup head 97 will move back and forth on the guide bar 98 with uneven tension and relaxation. That means, when the pickup head 97 passes a deformed portion on the guide bar 98 having a large radius of curvature, a large torque is required from the motor of the transmission mechanism to drive the movement of the pickup head 97. Therefore, it is difficult for the servo control systems of the optical disk drive to control the movements of the pickup head 97 resulting in increased difficulty in assembly and complexity in calibration.

SUMMARY OF INVENTION

It is therefore a primary objective of the claimed invention to provide an optical disk drive having a fixing structure with a fixed guide bar position to avoid deformation of the guide bar when being positioned in the optical disk drive. This is to ensure linear axial movement of the pickup head of the optical disk drive allowing convenient adjustment of a tilt angle and a direction of a spindle motor and a rotation plane of an optical disk.

It is another objective of the claimed invention to provide an optical disk drive combining a fixing structure and a fine tilt tuning function of the spindle motor to decrease the number of components and improve assembly efficiency.

The claimed invention optical disk drive comprises a mounting plate, an guide bar, a fixing structure for positioning the guide bar on the mounting plate, and a pickup head guided by the guide bar and moveable along a lengthwise direction of the guide bar. The pickup head reads/writes data on the optical disk by an optical means.

The fixing structure comprises a fixed joint and a flexible pressure-providing joint. The fixed joint rigidly fixes one end of the guide bar to the mounting plate, the flexible pressure-providing joint positions another end of the guide bar on the mounting plate, and the two ends of the guide bar are fixed in their relative positions due to a flatness of the mounting plate and despite a positioning action of the fixing structure such that linear movement of the pickup head is guided by the guide bar.

The optical disk drive further comprises a base positioned on the mounting plate and a spindle motor positioned on the base for driving the rotation of the optical disk. A plurality of pitch adjusting apparatuses is installed at different positions between the base and the spindle motor. Each pitch adjusting apparatus comprises a spring having two sides adjacent to the base and the spindle motor to separate the base and the spindle motor, and a screw connecting the base and the spindle motor to limit separation of the base and the spindle motor. A plane in which the optical disk driven by the spindle motor is located is adjusted by balancing the springs and the corresponding screws. An elastic member of the flexible pressure-providing joint is connected to one of the springs of the pitch adjusting apparatuses.

These and other objectives and advantages of the present invention will no doubt become obvious to those of ordinary skill in the art after reading the following detailed description of the preferred embodiment that is illustrated in the various figures and drawings.

DETAILED DESCRIPTION

The above-mentioned and other technical contents, features, and functions are clearly illustrated in the following detailed description of the preferred embodiment in coordination with the reference drawings.

Figure 1:
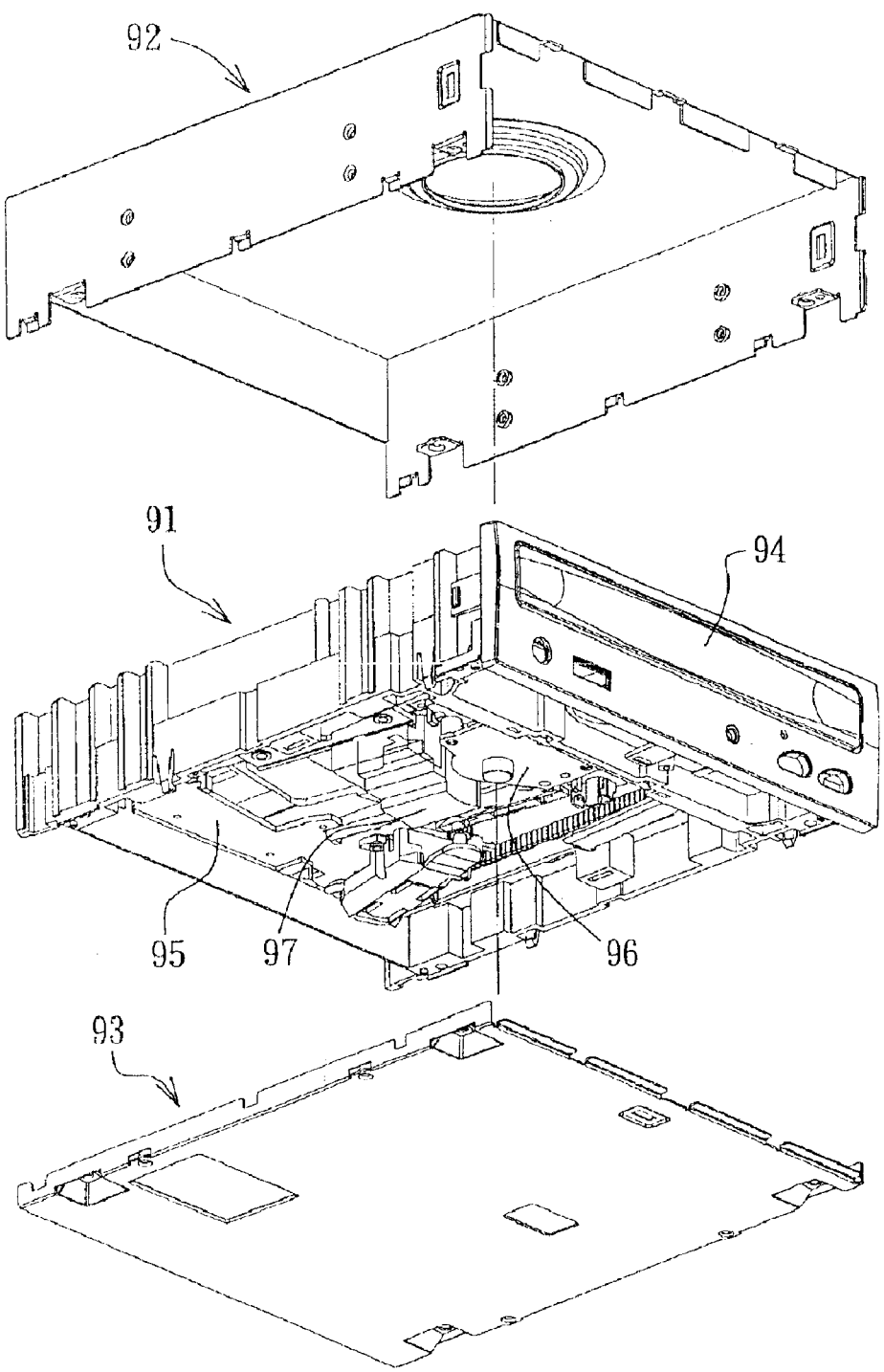
FIG. 1 is a three-dimensional exploded view of a prior art optical disk drive.
Figure 2:
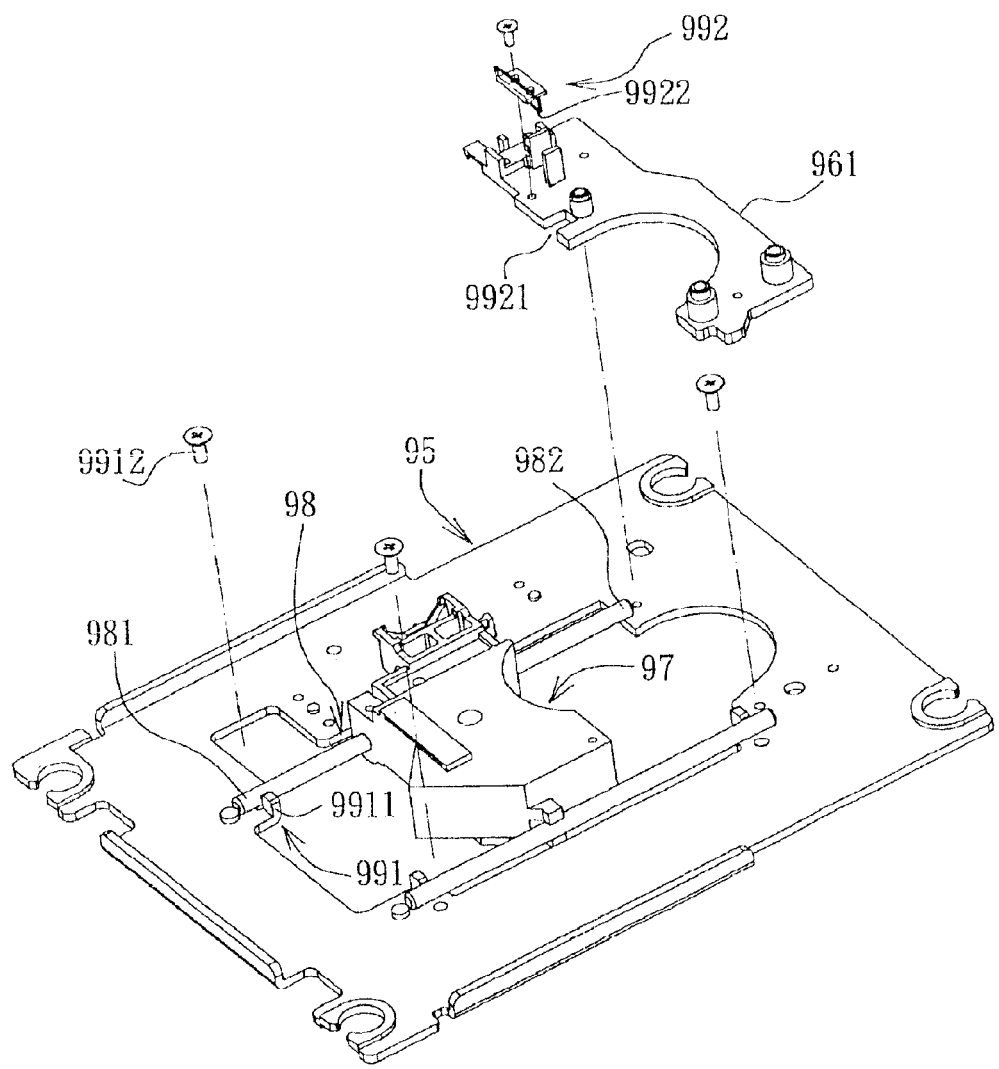
FIG. 2 is a partial exploded view of the optical disk drive depicted in FIG. 1 illustrating the assembly of a mounting plate and a guide bar.
Figure 3:
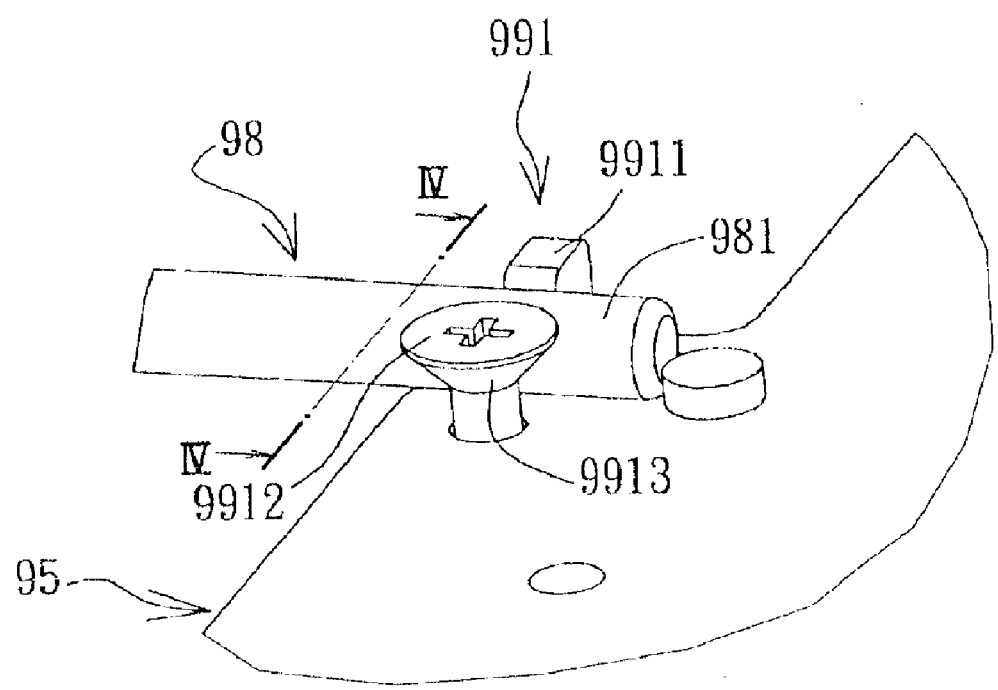
FIG. 3 is a three-dimensional enlarged schematic diagram of portions of the optical disk drive depicted in FIG. 2 after being assembled illustrating the assembly of a first end of the guide bar and the mounting plate.
Figure 4:
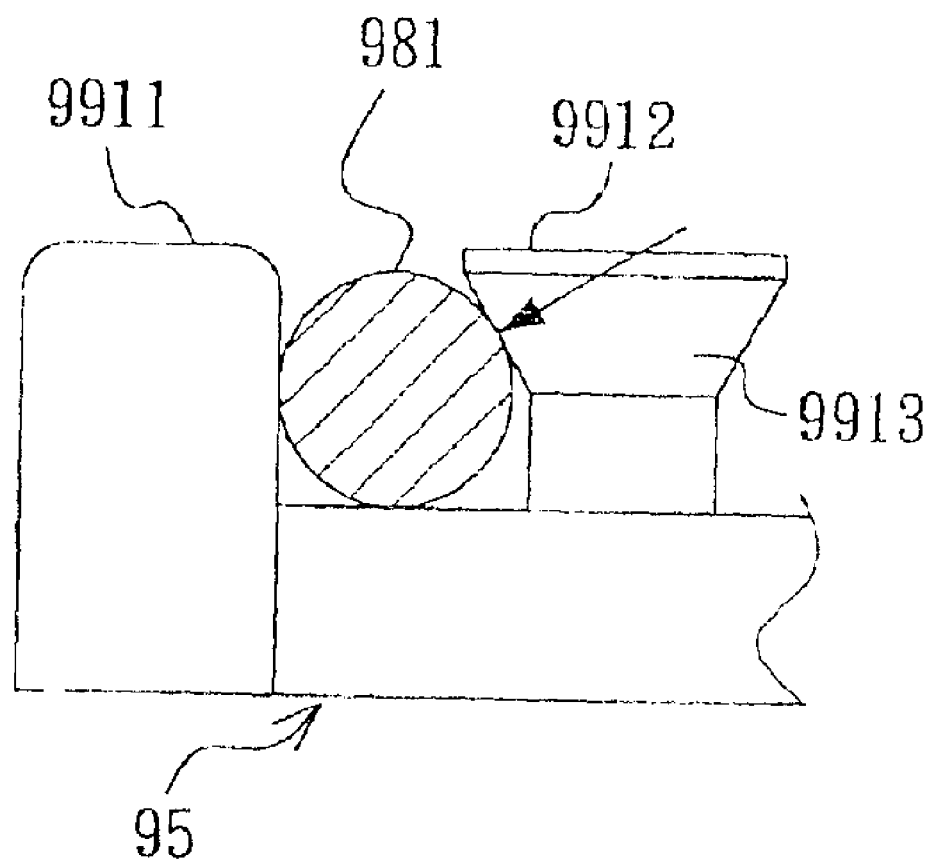
FIG. 4 is a cross-sectional diagram along a line IV—IV in FIG. 3.
Figure 5:
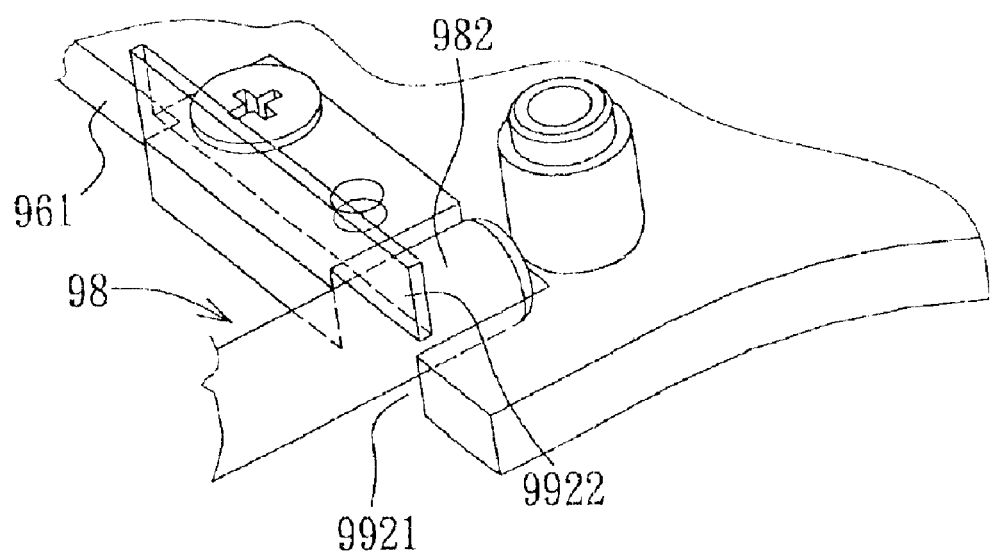
FIG. 5 is a three-dimensional enlarged schematic diagram of portions of the optical disk drive depicted in FIG. 2 after being assembled illustrating the assembly of a second end of the guide bar and the mounting plate.
Figure 6:
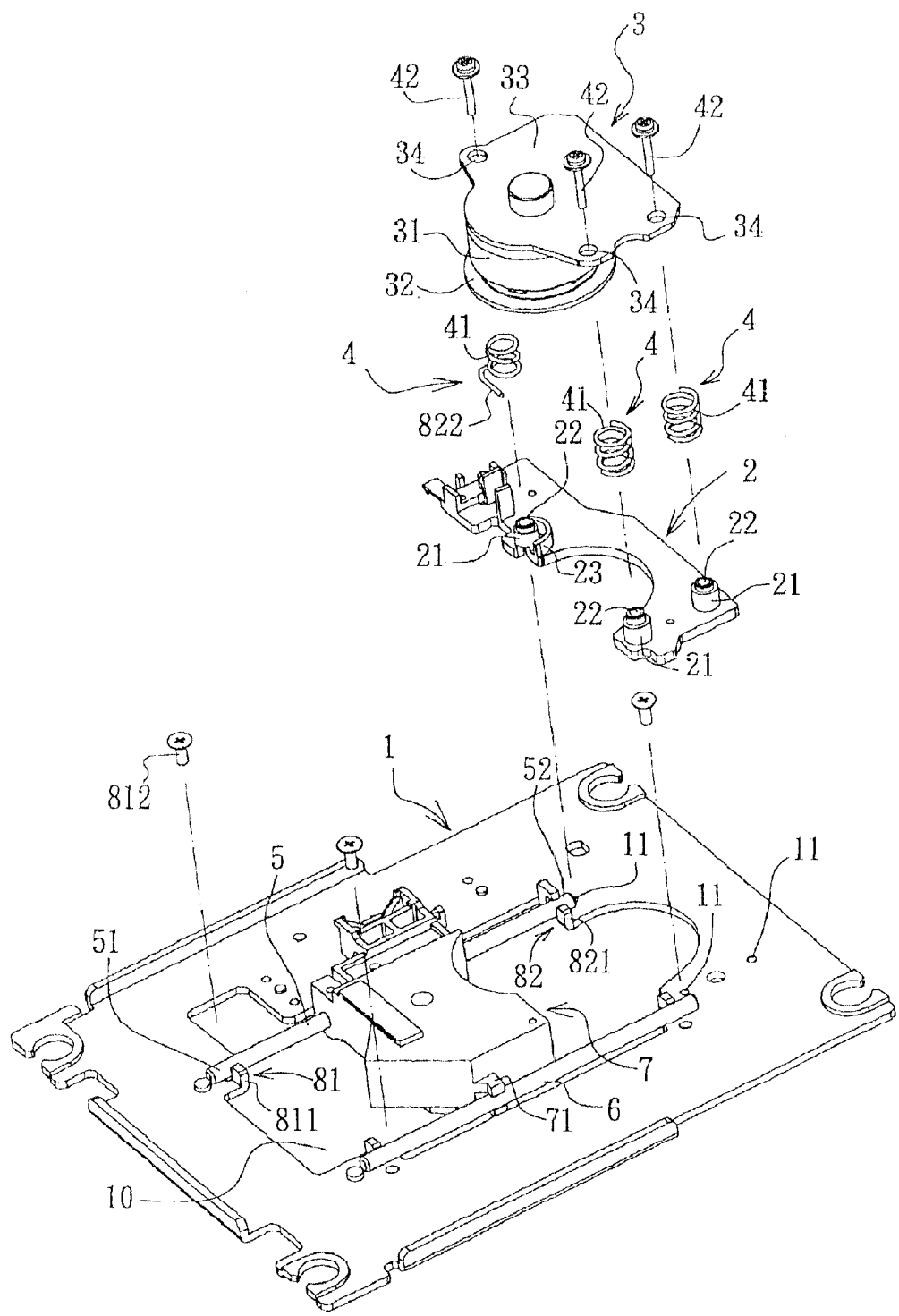
FIG. 6 is a three-dimensional exploded view of an optical disk drive illustrating relevant structure and assembly according to a preferred embodiment of the present invention.

Please refer to FIG. 6. FIG. 6 is a three-dimensional exploded view of an optical disk drive illustrating relevant structure and assembly according to a preferred embodiment of the present invention. As shown in FIG. 6, the optical disk drive according to the preferred embodiment of the present invention comprises a mounting plate 1, a base 2, a spindle motor 3, a plurality of pitch adjusting apparatuses 4 connecting the base 2 and the spindle motor 3, a guide bar 5, an auxiliary guide bar 6, a pickup head 7, and a fixing structure for positioning the guide bar 5 on the mounting plate 1. Since other components of the present invention optical disk drive are similar to those of the prior art optical disk drive and are not a stressed point in the present invention, they are not described in detail.

The mounting plate 1 is in the shape of a plane, and an opening 10 is included in the central portion of the mounting plate 1. Three bores 11 through the mounting plate 1 are installed on one side of the opening 10 at three different positions. The base 2 is a flat plate of relatively small area. The side of the base 2 close to the mounting plate 1 is mounted onto the mounting plate 1. Three alignment pillars 21 are installed on another side of the mounting plate 1. A through hole 22 is installed in the center of each alignment pillar 21, and the site for each through hole 22 corresponds to the site for one bore 11 in the mounting plate 1.

The spindle motor 3 comprises a motor 31, a disk holder 32 driven by the driving axis (not shown) of the motor 31 and coaxially rotating with the motor 31, and a bed plate 33 in conjunction with the motor 31. A hole 34 is installed at each site corresponding to the through hole 22 on the bed plate 33. A plurality of pitch adjusting apparatuses 4 are provided. In the preferred embodiment of the present invention, three sets of pitch adjusting apparatuses 4 are provided to match the numbers of the alignment pillars 21, the through holes 22, and the holes 34. Each of the pitch adjusting apparatuses 4 comprises a spiral spring 41 and a screw 42. Each of the springs 41 is sleeved over the corresponding alignment pillar 21. Therefore, the two sides of each of the springs 41 are adjacent to the base 2 and the bed plate 33 of the spindle motor 3 to separate the base 2 and the spindle motor 3 and to keep a space between the base 2 and the spindle motor 3. Furthermore, each of the screws 42, penetrating through the corresponding hole 34 of the spindle motor 3, the corresponding through hole 22 in the base 2, are threaded into the corresponding bore 11 in the mounting plate 1 to limit separation of the base 2 and the spindle motor 3 and to fix the base 2 together with the spindle motor 3 on the mounting plat 1. The disk holder 32 of the spindle motor, located in the opening 10 of the mounting plate 1, can be seen from the other side of the mounting plate 1 to drive the rotation of an optical disk (not shown).

The guide bar 5 is a long linear rod of round cross section. The guide bar 5 has a first end 51 and a second end 52 opposite the first end 51 along a lengthwise direction. The guide bar 5 is placed against the surface of the mounting plate 1 and across one side of the opening 10. The auxiliary guide bar 6 has a same shape as the guide bar 5. The auxiliary guide bar 6 is in parallel with and spaced apart from the guide bar 5 by a specific distance across another side of the opening 10.

The pickup head 7 is the component used for generating laser beams to move in the opening 10 of the mounting plate 1 to read/write data on the optical disk. One side of the pickup head 7 is mounted on and moved along the guide bar 5, and a forked part 71 is installed on another side of the pickup head 7 and saddled on the auxiliary guide bar 6. The pickup head 7 is driven by another transmission mechanism (not shown) so that the pickup head 7, guided by the guide bar 5, moves along the lengthwise direction of the guide bar 5 between the first end 51 and the second end 52. The auxiliary guide bar 6 is used for cooperating with the guide bar 5 to support the pickup head 7 and to maintain its existing state and not to be turned over. Therefore, the auxiliary guide bar 6 is used for supporting, rather than guiding.

The fixing structure comprises a fixed joint 81 and a flexible pressure-providing joint 82. The function of the fixed joint 81 is to rigidly fix the first end 51 of the guide bar 5 to the mounting plate 1, and the function of the flexible pressure-providing joint 82 is to position the second end 52 of the guide bar 5 on the mounting plate 1 by a flexible means.

Figure 7:
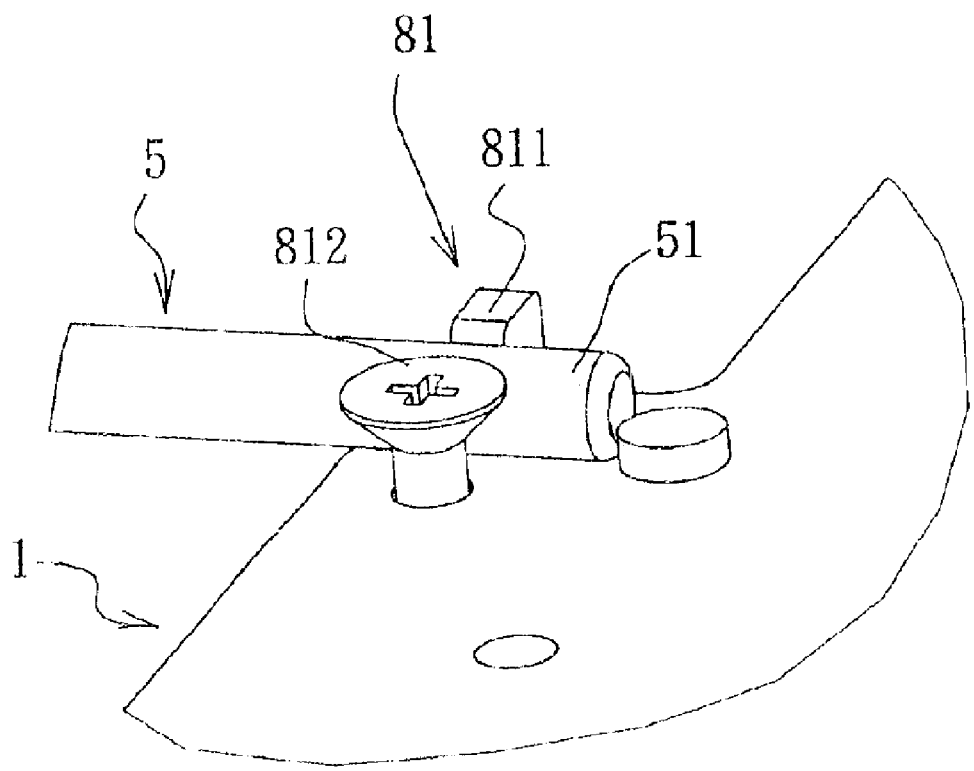
FIG. 7 is a three-dimensional enlarged schematic diagram illustrating the first end of the guide bar being fixed to a mounting plate.

Please also refer to FIG. 7. FIG. 7 is a three-dimensional enlarged schematic diagram illustrating the first end of the guide bar being fixed to a mounting plate. Based on this concept, the first end 51 of the guide bar 5 may be positioned on the mounting plate 1 with the fixed joint 81 by utilizing any rigidly positioning method. In the preferred embodiment of the present invention, a simplified exemplary description is provided. The fixed joint 81, as in the prior art, has a protruding supporting part 811 formed on the mounting plate 1, and a fastening apparatus 812 screwed to the mounting plate 1 so that the first end 51 of the guide bar 5 is positioned between the supporting part 811 and the fastening apparatus 812. By way of the tapering inclined plane underneath the head of the fastening apparatus 812, the first end 51 of the guide bar 5 is held against the supporting part 811 to rigidly and closely position the first end 51 of the guide bar 5 between the supporting part 811 and the fastening apparatus 812.

Figure 8:
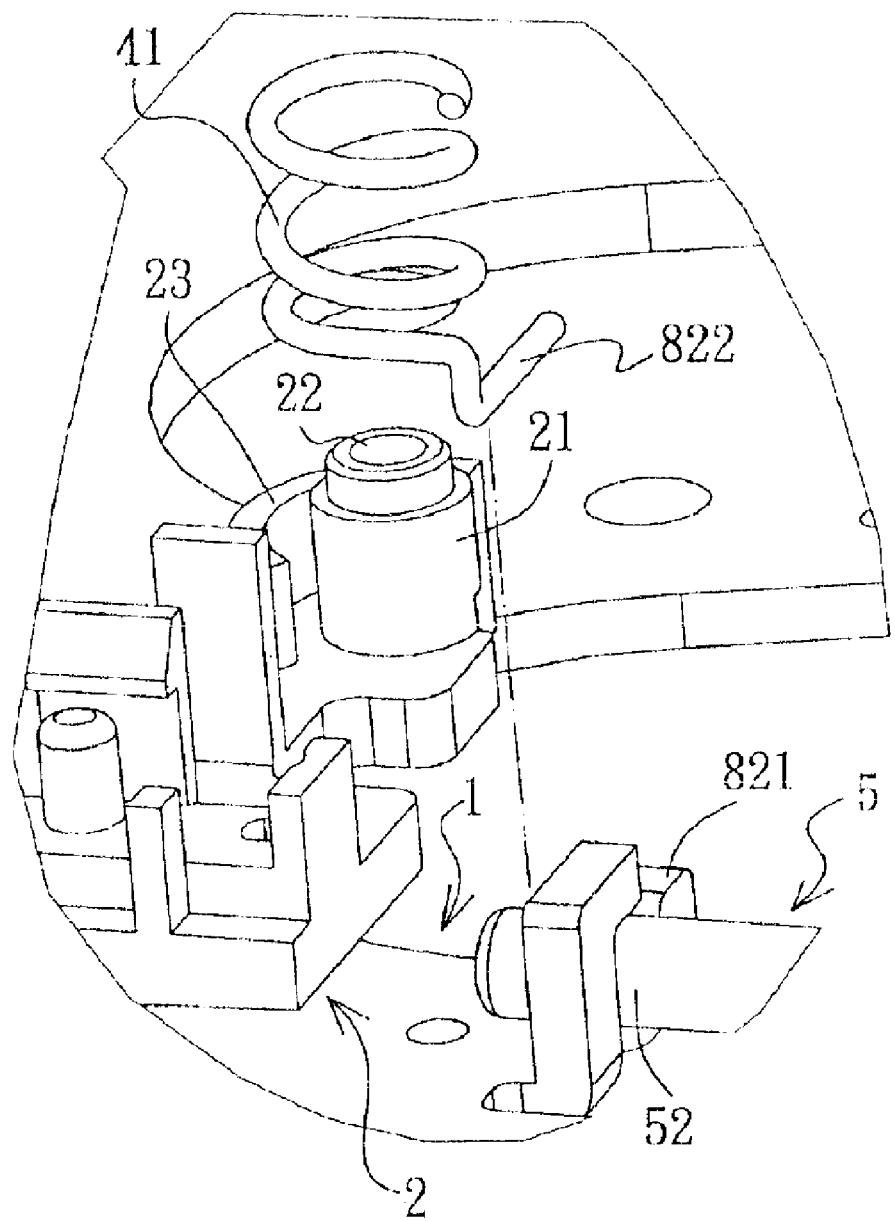
FIG. 8 is a three-dimensional enlarged exploded view illustrating a positioning of the second end of the guide bar and the mounting plate.
Figure 9:
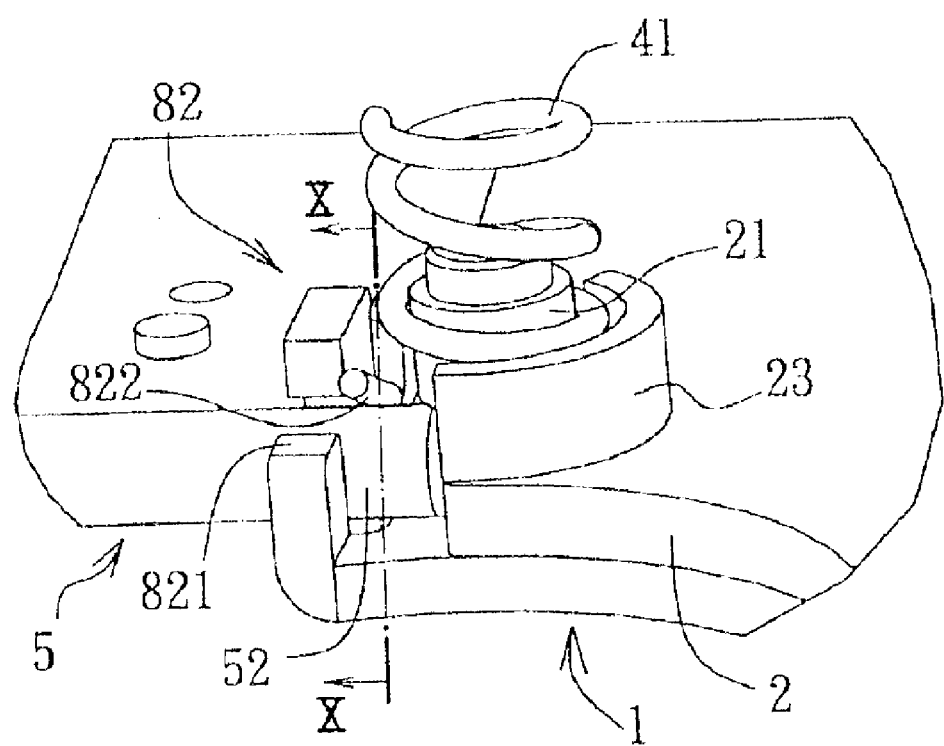
FIG. 9 is a three-dimensional enlarged diagram illustrating the positioning of the second end of the guide bar on the mounting plate viewed from another angle.
Figure 10:
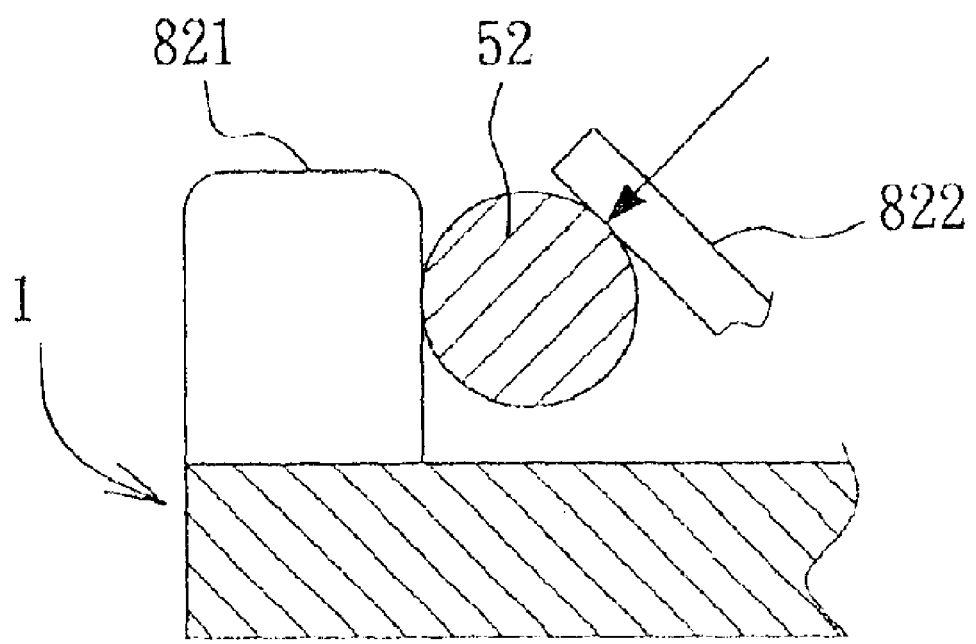
FIG. 10 is a cross-sectional diagram along a line X—X in FIG. 9.

Please refer to FIG. 6 and FIG. 8 to FIG. 10. FIG. 8 is a three-dimensional enlarged exploded view illustrating a positioning of the second end of the guide bar and the mounting plate. FIG. 9 is a three-dimensional enlarged diagram illustrating the positioning of the second end of the guide bar on the mounting plate viewed from another angle. FIG. 10 is a cross-sectional diagram along a line X—X in FIG. 9. As shown in FIG. 6 and FIG. 8 to FIG. 10, the flexible pressure-providing joint 82 comprises a protruding stop block 821 formed on the mounting plate 1 and an elastic member 822 formed of and extending from the spring 41 of one of the pitch adjusting apparatuses 4. The second end 52 of the guide bar 5 is positioned between the stop block 821 and the elastic member 822 and is held against by the elastic member 822. Due to the elastic force generated when the elastic member 822 is in contact with the second end 52 of the guide bar 5, a lateral component of force is generated to push the second end 52 of the guide bar 5 to the stop block 821. The second end 52 is thus retained between the stop block 821 and the elastic member 822 and cannot move freely to form a flexible positioning.

Please refer back to FIG. 6, since the main function of the auxiliary guide bar 6 is to support the pickup head 7, the two ends of the auxiliary guide bar 6 may be fixed by a rigid method with an apparatus having the same structure as the fixed joint 81. Because the structure and the working principle of this portion are not relevant to the present invention, they are not discussed further.

After being assembled, the first end 51 and the second end 52 of the guide bar 5 are positioned on the mounting plate 1 with the fixed joint 81 and the flexible pressure-providing joint 82, respectively. Because the first end 51 is rigidly and closely positioned on the surface of the mounting plate 1 by the fastening apparatus 812, and the flatness of the surface of the mounting plate 1 is not even, a slight deformation may occur when the second end 52 of the guide bar 5 is positioned on the mounting plate 1. However, since the second end 52 is positioned by the flexibility permissible elastic member 822, the deformation displacement of the second end 52 will be absorbed by the displacement of the elastic member 822 (as shown in FIG. 10, the second end 52 is not in contact with the mounting plate 1). Therefore, the first end 51 and the second end 52 of the guide bar 5 are fixed in their relative positions. That means, the guide bar 5 will not bend or deform such that its straightness is maintained. As a result, the pickup head 7 guided by the guide bar 5 will move along a fixed line.

Please refer back to FIG. 6, the relative distances between the spindle motor 3 and the base 2 at three different positions are adjusted by utilizing three sets of pitch adjusting apparatuses 4, located between the spindle motor 3 and the base 2 at different positions. The spring 41 of each of the pitch adjusting apparatuses 4 and the corresponding screw 42 are balanced. Since three points determine a plane, the corresponding tilt angle and direction between the spindle motor 3 and the base 2 (and also the mounting plate 1) is fine tuned to adjust the rotational plane in which the optical disk driven by the disk holder 32 of the spindle motor 3 is located. Once positioned, the pickup head 7 can read/write data on the optical disk correctly. Deformation of the guide bar incurred from being fixed is avoided and so are the resulting reading/writing reliability problems that frequently occur in the prior art optical disk drive.

In addition, the elastic member 822 is connected to the spring 41 of the nearest pitch adjusting apparatus 4, according to the preferred embodiment of the present invention. Actually, the elastic member 822 may be formed of and extend from the spiral spring 41 by turning the lower end of the spring 41 downwards and to the side. Under these circumstances, the elastic member 822 and the spring 41 are combined as a single component. When the springs 41 are sleeved onto the corresponding alignment pillars 21, the elastic member 822 contacts the second end 52 of the guide bar 5. When the screws 42 are threaded to press the springs 41, a force is generated by the elastic member 822 to press the second end 52 of the guide bar 5. Not only is the number of components decreased, but also assembly efficiency is improved.

As shown in FIG. 9, when the spring 41 having the elastic member 822 is sleeved onto the corresponding alignment pillar 21, the elastic member 822 contacts the second end 52 of the guide bar 5. If the screw 42 is not tightened at this time, another side of the spring 41 is free so the spring will collapse to the opposite side owing to the reactive force of the elastic member 822. In order to complete assembly, a semicircular stop block 23 is provided at one side of the corresponding alignment pillar 21 on the base 2. The stop block 23 is located at the opposite side of the spring 41 having the elastic member 822 so that the reactive force exerted on the spring 41 is hindered by the stop block 23 when the elastic member 822 is in contact with the guide bar 5. Therefore, the spring 41 is securely sleeved onto the alignment pillar 21 to expedite the subsequent assembly of the spindle motor 3 and the tightening of the corresponding screws 42.

In summary, the present invention optical disk drive utilizes the fixed joint 81 and the flexible pressure-providing joint 82 to position the two ends of the guide bar 5 on the mounting plate 1. Therefore, one end of the guide bar 5 is fixed by a rigid means and the other end of the guide bar 5 is fixed by a flexible means to avoid deformation of the mounting plate 1. In addition, the displacement of the guide bar 5 is automatically absorbed and compensated for to maintain the straightness the guide bar 5. As a result, a linear movement of the pickup head 7 is ensured. Since the linear movement of the pickup head 7 is maintained after assembly processes, and the tilt angle of the spindle motor 3 is adjusted, the reliability of reading/writing data with the pickup head 7 is greatly improved. Furthermore, the complex procedures for adjusting the mechanism of the prior art optical disk drive and the accuracy requirement for assembly in the prior art optical disk drive are reduced. In the previously mentioned description, the elastic member 822 of the flexible pressure-providing joint 82 is not limited to extending from the spring of one of the pitch adjusting apparatuses 4 forming a single component. Actually, the elastic member 822 and the spring 41 may be separate from each other, formed of individual components. Moreover, the designs for the fixed joint 81 and the flexible pressure-providing joint 82 are not necessarily strict, and those of ordinary skill in the art may make modifications according to practical requirements. Fastening the two ends of the guide bar 5 with any rigid means and any flexible means is permissible if it will achieve the same result.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optical disk drive for reading/writing data on an optical disk, the optical disk drive comprising:

a mounting plate;

a base fixed on the mourning plate;

a spindle motor movably positioned on the base to drive the rotation of the optical disk;

a plurality of pitch adjusting apparatuses, each of the pitch adjusting apparatuses comprising a spring having two sides adjacent to the base and the spindle motor to separate the base and the spindle motor, and a screw Connecting the base and the spindle motor to limit separation of the base and the spindle motor, wherein a plane in which the optical disk driven by the spindle motor is located is adjusted by changing relative distances between the spindle motor and the base at different positions to balance the springs and the corresponding screws;

a guide bar having a first end and a second end along a lengthwise direction of the guide bar positioned on the mounting plate;

a pickup head mounted on the guide bar and movable along the lengthwise direction of the guide bar between the first end and the second end, the pickup head capable of reading/writing data on the optical disk by an optical means; and a fixing structure comprising a fixed joint and a flexible pressure-providing joint, the fixed joint rigidly fixing the first end of the guide bar to the mounting plate, the flexible pressure-providing joint having a stop block positioned on the mounting plate, and an elastic member extended from one of the springs of the plurality of pitch adjusting apparatuses for pushing the second end of the guide bar towards the stop block, and the first end and the second end of the guide bar fixed in their relative positions due to a flatness of the mounting plate and despite a positioning action of the fixing structure such that linear movement of the pickup head being guided by the guide bar.

2. The optical disk drive of claim 1 wherein the fixed joint of the fixing structure has a supporting part positioned on the mounting plate and a fastening apparatus screwed to the mounting plate so that the first end of the guide bar is positioned between the supporting part and the fastening apparatus, and the fastening apparatus holds the first end of the guide bar against the supporting part to rigidly and closely position the first end of the guide bar between the supporting part and the fastening apparatus.

* * * * *